US012361766B2

(12) United States Patent
Kujirai et al.

(10) Patent No.: US 12,361,766 B2
(45) Date of Patent: Jul. 15, 2025

(54) VIDEO PROVISION APPARATUS, VIDEO PROVISION METHOD, AND NON-TRANSITORY COMPUTER-READABLE MEDIUM

(71) Applicant: NEC Corporation, Tokyo (JP)

(72) Inventors: Hiroaki Kujirai, Tokyo (JP); Satoru Fujita, Tokyo (JP); Kazufumi Hoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/272,910

(22) PCT Filed: Jul. 12, 2021

(86) PCT No.: PCT/JP2021/026174
§ 371 (c)(1),
(2) Date: Jul. 18, 2023

(87) PCT Pub. No.: WO2023/286133
PCT Pub. Date: Jan. 19, 2023

(65) Prior Publication Data
US 2024/0087369 A1 Mar. 14, 2024

(51) Int. Cl.
G06T 5/20 (2006.01)
G06T 5/50 (2006.01)
G06V 20/52 (2022.01)
G07C 1/24 (2006.01)

(52) U.S. Cl.
CPC .............. G07C 1/24 (2013.01); G06T 5/50 (2013.01); G06V 20/52 (2022.01); G06T 2207/20221 (2013.01)

(58) Field of Classification Search
None
See application file for complete search history.

(56) References Cited

U.S. PATENT DOCUMENTS 6,023,287 A * 2/2000 Kimura ............ H04N 21/47205
348/E7.091
2019/0089996 A1 3/2019 Surcouf et al.
2021/0258496 A1* 8/2021 Yoshida ............... H04N 21/431

FOREIGN PATENT DOCUMENTS

| JP | H09-233458 A | 9/1997 |
| JP | 2004-064511 A | 2/2004 |
| JP | 2004-192632 A | 7/2004 |
| JP | 2007-158860 A | 6/2007 |
| JP | 2018-025734 A | 2/2018 |

(Continued)

OTHER PUBLICATIONS

International Search Report for PCT Application No. PCT/JP2021/026174, mailed on Sep. 28, 2021.

(Continued)

*Primary Examiner* — Samuel D Fereja

(57) ABSTRACT

A video provision apparatus (10) includes a specification unit (11) for acquiring a racer ID for identifying a racer specified by a user from among racers that participate in a race, a video collection unit (12) for collecting videos of the race captured in the same time section from a plurality of cameras, a generation unit (15) for generating, based on the racer ID specified by the user, a user-specific video from the videos collected from the plurality of cameras, and an output control unit (16) for causing a user terminal used by the user to output the user-specific video.

11 Claims, 17 Drawing Sheets

(56) References Cited

FOREIGN PATENT DOCUMENTS

| JP | 2018-081515 A | 5/2018 |
| JP | 2018-098573 A | 6/2018 |
| JP | 2019-013057 A | 1/2019 |
| JP | 2021-010081 A | 1/2021 |
| WO | 2014/024475 A1 | 2/2014 |

OTHER PUBLICATIONS

JP Office Communication for JP Application No. 2023-534455, mailed on Jan. 9, 2024 with English Translation.

\* cited by examiner

115

| ELAPSED TIME FROM START[s] | PRIORITY TARGET |
|---|---|
| $t_1 \sim t_2$ | FIXED CAMERA |
| $t_2 \sim t_3$ | DRONE CAMERA |
| $t_3 \sim t_4$ | ONBOARD CAMERA |
| $t_4 \sim$ | FIXED CAMERA |

Fig. 11

VIDEO PROVISION APPARATUS, VIDEO PROVISION METHOD, AND NON-TRANSITORY COMPUTER-READABLE MEDIUM

This application is a National Stage Entry of PCT/JP2021/026174 filed on Jul. 12, 2021, the contents of all of which are incorporated herein by reference, in their entirety.

TECHNICAL FIELD

The present disclosure relates to a video provision apparatus, a video provision system, a video provision method, and a non-transitory computer-readable medium, and more particularly, to a video provision apparatus, a video provision system, a video provision method, and a non-transitory computer-readable medium for providing a race video.

BACKGROUND ART

In a sport venue for horse racing or the like, audience views a sport event by watching the same sport event video that is displayed on a large video display. These days, a video distribution system for allowing the audience to watch performance of racers in a desirable manner is being developed.

For example, Patent Literature 1 discloses a real-time viewing system for a professional golf tournament or the like where a plurality of players perform in different places at the same time. With the real-time viewing system, a video collection/distribution apparatus adds, to a broadcast signal, a recommend flag that is placed in a predetermined signal state in a recommended scene that the audience is recommended to watch, and information for identifying a player who is shown in a video. Then, an audience terminal detects the recommended scene and the information for identifying a player from the broadcast signal, and notifies the audience of the same.

CITATION LIST

Patent Literature

Japanese Unexamined Patent Application Publication No. 2019-013057

SUMMARY OF INVENTION

Technical Problem

In relation to viewing of a sport event such as horse racing, there is a demand from audience to be able to easily watch a personalized race video focusing on a desired racer. However, with the real-time viewing system disclosed in Patent Literature 1 mentioned above, the video collection/distribution apparatus is not capable of directly providing a video that is suitable for each audience member. Accordingly, there is a problem in that an audience member has to select and switch to the video of a desired racer from a video that is being broadcast.

In view of the problem described above, the present disclosure is aimed at providing a video provision apparatus, a video provision system, a video provision method, and a non-transitory computer-readable medium for suitably providing a personalized race video that is related to a racer specified by a user.

Solution to Problem

A video provision apparatus according to an aspect of the present disclosure includes:
specification means for acquiring a racer ID for identifying a racer specified by a user from among racers that participate in a race;
video collection means for collecting videos of the race captured in the same time section from a plurality of cameras;
generation means for generating, based on the racer ID specified by the user, a user-specific video from the videos collected from the plurality of cameras; and
output control means for causing a user terminal used by the user to output the user-specific video.

A video provision system according to an aspect of the present disclosure includes:
a video provision apparatus; and
a user terminal that is used by a user, in which
the video provision apparatus includes
specification means for acquiring a racer ID for identifying a racer specified by the user from among racers that participate in a race,
video collection means for collecting videos of the race captured in the same time section from a plurality of cameras,
generation means for generating, based on the racer ID specified by the user, a user-specific video from the videos collected from the plurality of cameras, and
output control means for causing the user terminal to output the user-specific video.

A video provision method according to an aspect of the present disclosure includes:
acquiring a racer ID for identifying a racer specified by a user from among racers that participate in a race;
collecting videos of the race captured in the same time section from a plurality of cameras;
generating, based on the racer ID specified by the user, a user-specific video from the videos collected from the plurality of cameras; and
causing a user terminal used by the user to output the user-specific video.

A non-transitory computer-readable medium according to an aspect of the present disclosure stores a program for causing a computer to perform:
a specification process for acquiring a racer ID for identifying a racer specified by a user from among racers that participate in a race;
a video collection process for collecting videos of the race captured in the same time section from a plurality of cameras;
a generation process for generating, based on the racer ID specified by the user, a user-specific video from the videos collected from the plurality of cameras; and
an output control process for causing a user terminal used by the user to output the user-specific video.

Advantageous Effects of Invention

According to the present disclosure, there may be provided a video provision apparatus, a video provision system, a video provision method, and a non-transitory computer-readable medium for suitably providing a personalized race video that is related to a racer specified by a user.

BRIEF DESCRIPTION OF DRAWINGS

FIG. 11 is a diagram for describing an example of a camerawork priority rule according to the third example embodiment;

EXAMPLE EMBODIMENT

Figure 1:
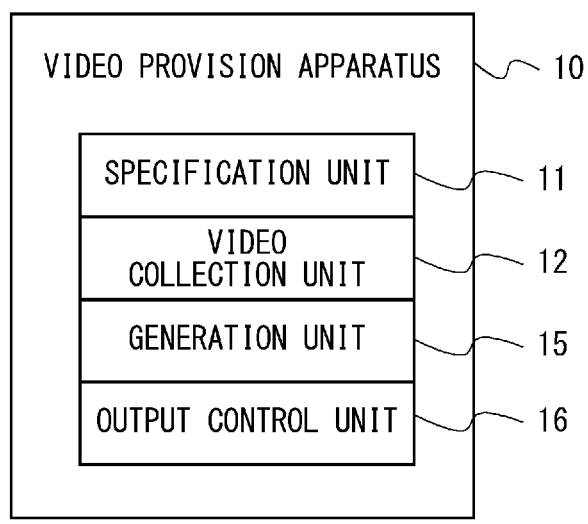
FIG. 1 is a block diagram showing a configuration of a video provision apparatus according to a first example embodiment.

Hereinafter, example embodiments of the present disclosure will be described in detail with reference to the drawings. In the drawings, same or corresponding elements are denoted by the same reference sign, and a redundant description is omitted as necessary for the sake of clarity of description.

First Example Embodiment

First, a first example embodiment of the present disclosure will be described. FIG. 1 is a block diagram showing a configuration of a video provision apparatus 10 according to the first example embodiment. The video provision apparatus 10 is a computer apparatus for providing a video of a racing competition to a user who is an audience member. A racing competition may be a sport event where a plurality of racers compete for speed on track. For example, a racing competition may be horse racing, motorboat racing, bicycle racing, car racing, track and field racing, speed skating, or the like. A racer may be an athlete in a competition, an animal (such as a racehorse), or a tool used in a competition (such as a car or a bicycle).

The video provision apparatus 10 is connected to a network (not shown). The network may be wired or wireless. Furthermore, a user terminal (not shown) used by a user is connected to the network. That is, the video provision apparatus 10 is communicably connected to the user terminal via the network.

The video provision apparatus 10 includes a specification unit 11, a video collection unit 12, a generation unit 15, and an output control unit 16.

The specification unit 11 is referred to also as specification means. The specification unit 11 acquires a racer ID for identifying a racer specified by a user, among racers participating in a race. In the following, a racer specified by a user may be referred to as a specified racer.

The video collection unit 12 is referred to also as video collection means. The video collection unit 12 collects, from each of a plurality of cameras, a video of a race captured in the same time section. The plurality of cameras may include cameras with different camerawork. Camerawork may be an angle of view, movement/non-movement of the camera, a manner of movement, and the like. A time section is a time interval that is long enough for videos to be recognized by a user as having been captured at the same timing or in the same time slot, and may be a time interval such as one to several frame rates [fps] or several to several tens of seconds [s], for example. The time interval may be set in advance based on frame rates of a plurality of cameras.

The generation unit 15 is referred to also as generation means. The generation unit 15 generates a user-specific video from videos collected from the plurality of cameras, based on the racer ID of the specified racer.

The output control unit 16 is referred to also as output control means. The output control unit 16 causes the user terminal to output the user-specific video. For example, the output control unit 16 transmits (distributes) streaming data of the user-specific video to the user terminal, and the user terminal displays the user-specific video on a display unit (not shown) in real-time. Alternatively, the output control unit 16 may collectively transmit stock data of the user-specific video to the user terminal, and the user terminal may display the user-specific video on the display unit (not shown). In the following, such streaming data or stock data may be referred to as distribution data.

Figure 2:
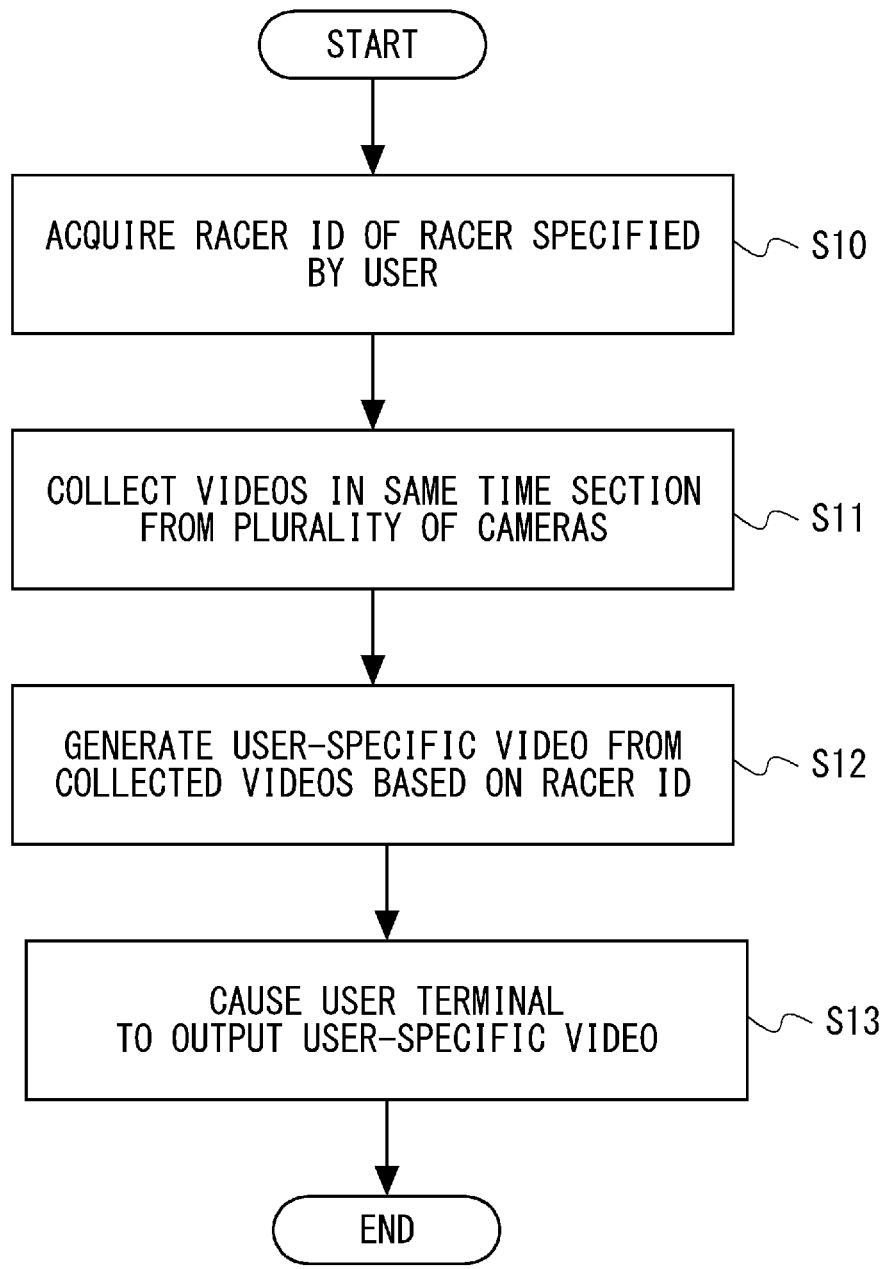
FIG. 2 is a flowchart showing a flow of a video provision method according to the first example embodiment.

FIG. 2 is a flowchart showing a flow of a video provision method according to the first example embodiment. First, the specification unit 11 of the video provision apparatus 10 acquires the racer ID of a racer specified by the user (S10). Next, the video collection unit 12 collects, from the plurality of cameras, videos captured in the same time section (S11). Next, the generation unit 15 generates the user-specific video from the videos collected by the video collection unit 12, based on the racer ID acquired by the specification unit 11 (S12). Then, the output control unit 16 causes the user terminal to output the user-specific video (S13).

In this manner, according to the first example embodiment, the video provision apparatus 10 is able to suitably provide a user-specific race video that is related to a racer specified by a user. A user may thereby watch a desired race video in a desirable manner, and satisfaction of the user may be increased.

Second Example Embodiment

Figure 3:
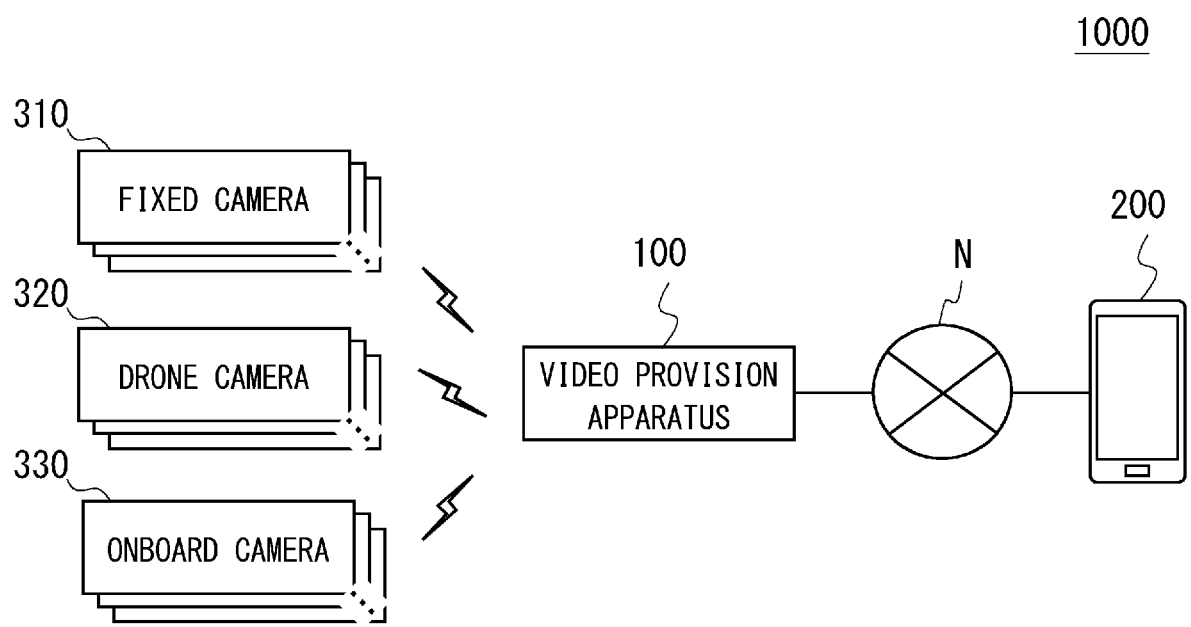
FIG. 3 is a block diagram showing an overall configuration of a video provision system according to a second example embodiment.

Next, a second example embodiment of the present disclosure will be described. FIG. 3 is a block diagram showing an overall configuration of a video provision system 1000 according to the second example embodiment. The video provision system 1000 is a computer system for providing a video of a racing competition to a user who is an audience member. The video provision system 1000 includes one or more fixed cameras 310, one or more drone cameras 320, one or more onboard cameras 330, a video provision apparatus 100, and a user terminal 200. The fixed camera 310, the drone camera 320, and the onboard camera 330 are wirelessly connected to the video provision apparatus 100. In the second example embodiment, the fixed camera 310, the drone camera 320, and the onboard camera 330 are connected to the video provision apparatus 100 over a network of 5G (5th Generation Mobile Communication System) or local 5G. Alternatively, various cameras and the video provision apparatus 100 may be connected over a network of another mobile communication system or a wireless LAN (Local Area Network) such as Wi-Fi (registered trademark). Alternatively, various cameras may include a camera that is connected to the video provision apparatus 100 in a wired manner. Moreover, the video provision apparatus 100 and the user terminal 200 are connected to each other over a network N. The network N here is a wired or wireless communication line.

The fixed cameras 310 are installed at different locations in a race venue. For example, the fixed cameras 310 may be installed at locations from which scenes at a start point, a middle point, and a goal point of a track can be captured, respectively.

The drone camera 320 is a camera for capturing a race scene from the air. The drone camera 320 may move to follow one or more racers, and may capture one or more racers from the air.

The onboard camera 330 is a camera that is attached to the body of each racer or to a tool used by each racer, and that moves according to movement of the racer. For example, the onboard camera 330 is a camera that captures a field of view of the racer.

The video provision apparatus 100 is an example of the video provision apparatus 10 described above. The video provision apparatus 100 collects a video from each of the fixed camera 310, the drone camera 320, and the onboard camera 330 with different camerawork from one another. Then, the video provision apparatus 100 generates a user-specific video that is related to a racer specified by the user, based on the collected videos. Then, the video provision apparatus 100 transmits the user-specific video that is generated to the user terminal via the network N.

The user terminal 200 is an information terminal that is used by the user. The user terminal 200 notifies the video provision apparatus 100 of the racer ID of the specified racer. For example, the user terminal 200 accesses a webpage or an application related to a race, causes a list of racers to be displayed, and asks the user to select a user ID. Then, the user terminal 200 notifies the video provision apparatus 100 of the selected user ID. Furthermore, for example, the user terminal 200 notifies the video provision apparatus 100 of an ID of a racer associated with a betting ticket (such as a horse race betting ticket) purchased by the user. For example, the user terminal 200 may notify the video provision apparatus 100 of the racer ID of the specified racer by reading a QR code (registered trademark) shown on the purchased betting ticket for the race. Additionally, notification of the racer ID may be performed by an external apparatus managing sales of betting tickets, instead of by the user terminal 200. Then, at the time of the race, the user terminal 200 receives distribution data of the user-specific video from the video provision apparatus 100, and displays the user-specific video according to the distribution data.

Figure 4:
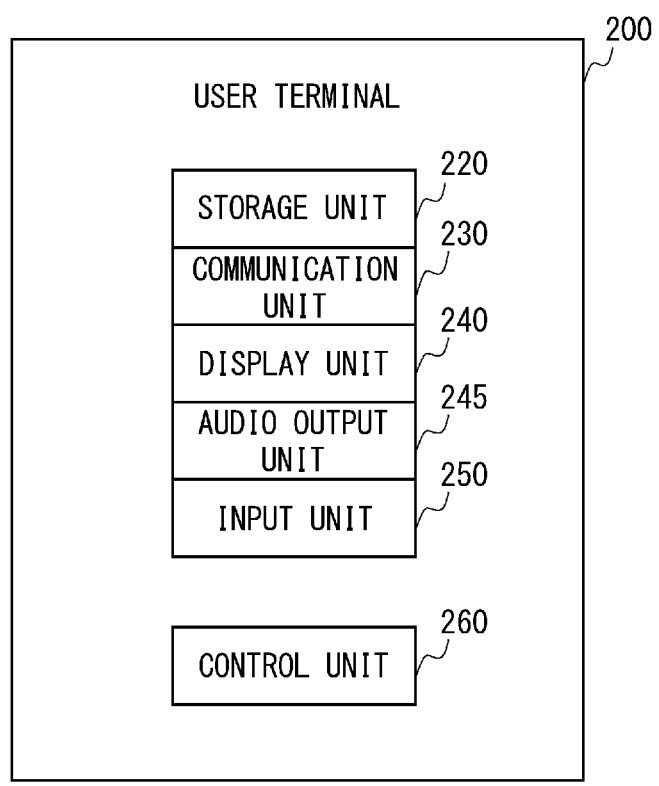
FIG. 4 is a block diagram showing a configuration of a user terminal according to the second example embodiment.

FIG. 4 is a block diagram showing a configuration of the user terminal 200 according to the second example embodiment. The user terminal 200 includes a storage unit 220, a communication unit 230, a display unit 240, an audio output unit 245, an input unit 250, and a control unit 260.

The storage unit 220 is a storage device for storing programs for implementing functions of the user terminal 200. The communication unit 230 is a communication interface to the network N. The display unit 240 is a display device. The audio output unit 245 includes a speaker for outputting audio. The input unit 250 is an input device for receiving input. The display unit 240 and the input unit 250 may be integrally formed as a touch panel, for example. The control unit 260 controls hardware of the user terminal 200.

For example, when an input screen for specifying a racer ID is received from the video provision apparatus 100 via the communication unit 230, the control unit 260 displays the input screen that is received, on the display unit 240. Then, in a case where a racer ID is input via the input unit 250, the control unit 260 transmits the racer ID to the video provision apparatus 100 via the communication unit 230. Alternatively, the control unit 260 transmits, to the video provision apparatus 100, a racer ID that is acquired by reading the QR code shown on the purchased betting ticket. Then, when the distribution data including the user-specific video is received from the video provision apparatus 100 via the communication unit 230, the control unit 260 displays the user-specific video on the display unit 240 based on the distribution data that is received.

Figure 5:
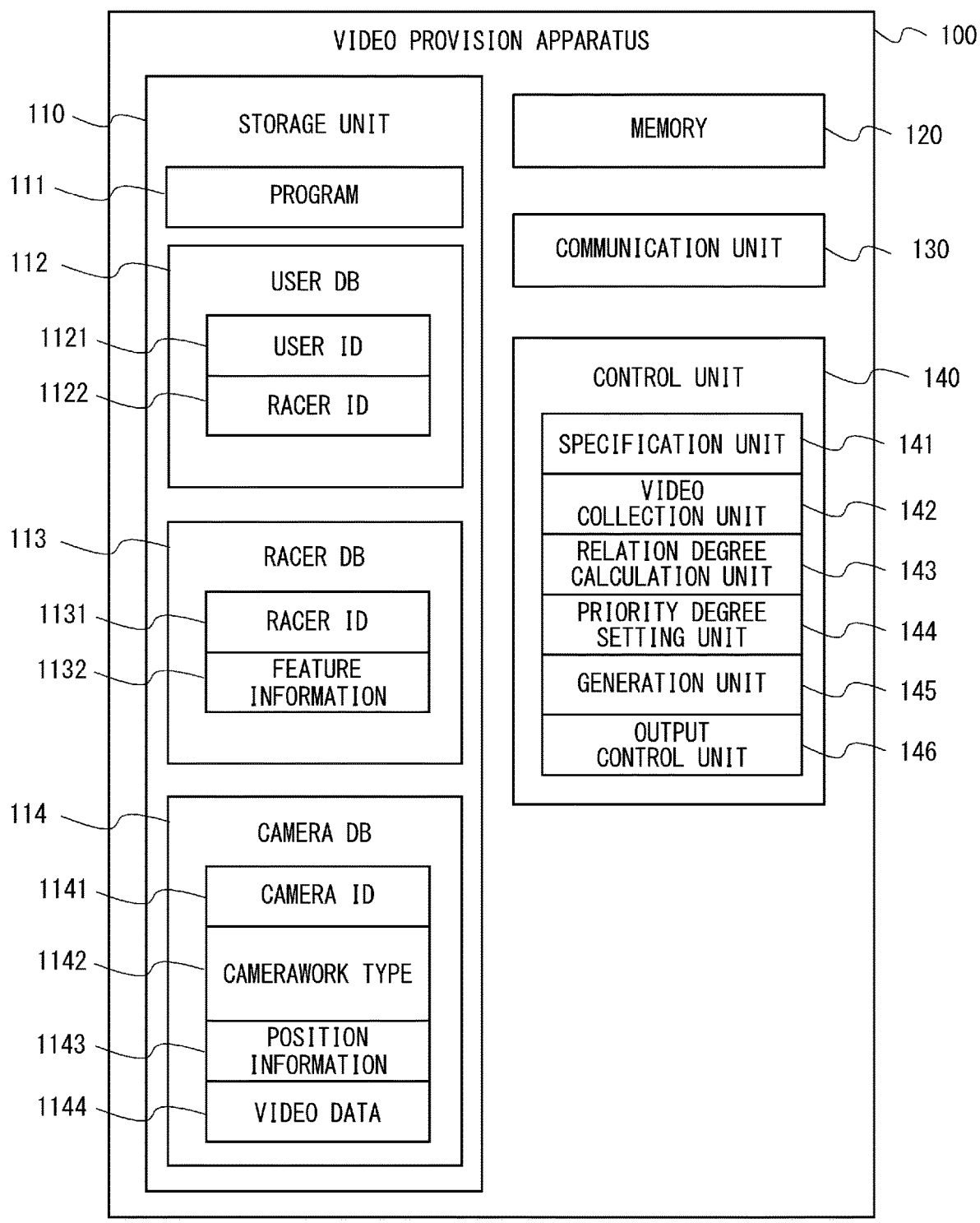
FIG. 5 is a block diagram showing a configuration of a video provision apparatus according to the second example embodiment.

FIG. 5 is a block diagram showing a configuration of the video provision apparatus 100 according to the second example embodiment. The video provision apparatus 100 includes a storage unit 110, a memory 120, a communication unit 130, and a control unit 140.

The storage unit 110 is a storage device such as a hard disk or a flash memory. The storage unit 110 stores a program 111, a user DB 112, a racer DB 113, and a camera DB 114. The program 111 is a computer program for implementing a process of a video provision method according to the second example embodiment.

The user DB 112 is a database associating a user ID 1121 and a racer ID 1122. The user ID 1121 is information for identifying the user. The racer ID 1122 is information for identifying a specified racer specified by the user.

The racer DB 113 is a database associating a racer ID 1131 and feature information 1132. The racer ID 1131 is information for identifying each racer participating in a race. The feature information 1132 is information indicating a feature that is extracted from an image capturing the racer corresponding to the racer ID 1131. For example, in the case where the racer is a player, the feature information 1132 may be information indicating a feature of a face. Alternatively, the feature information 1132 may be information indicating a feature that is extracted from an image capturing clothes worn by the racer (such as a uniform or a number cloth) or a tool used by the racer (such as a car or a bicycle). For example, in the case where the racer is wearing a number cloth, the feature information 1132 may be information indicating a feature such as the number on the number cloth.

The camera DB 114 is a database associating a camera ID 1141, a camerawork type 1142, position information 1143, and video data 1144.

The camera ID 1141 is information for identifying each camera among the fixed camera 310, the drone camera 320, and the onboard camera 330. The camerawork type 1142 is information indicating type of the camerawork of the corresponding camera. As described above, the camerawork may be an angle of view, movement/non-movement, a manner of movement, and the like, and the camerawork type 1142 may be information for distinguishing between the fixed camera 310, the drone camera 320, and the onboard camera 330. The position information 1143 is position information of the corresponding camera. For example, in the case where the camera is the fixed camera 310, the position information 1143 may be position information of an installation location of the corresponding camera. Furthermore, in the case where the camera is the drone camera 320 or the onboard camera 330, the position information 1143 may be GPS (Global Positioning System) information received by the corresponding camera. The video data 1144 is video data that is captured by the corresponding camera and that is acquired by the video provision apparatus 100 from the camera. The memory 120 is a volatile storage device such as a RAM (Random Access Memory), and is a storage area for temporarily holding information at the time of operation of the control unit 140. The communication unit 130 includes a communication interface to the network N, and a communication interface to each camera.

The control unit 140 is a processor, that is, a control device, for controlling each component of the video provision apparatus 100. The control unit 140 causes the program 111 to be read from the storage unit 110 into the memory 120 and thus executes the program 111. The control unit 140 thus implements functions of a specification unit 141, a video collection unit 142, a relation degree calculation unit 143, a priority degree setting unit 144, a generation unit 145, and an output control unit 146.

The specification unit 141 is an example of the specification unit 11 described above. The specification unit 141 receives data from the user terminal 200 via the network N. The data that is received here may include the user ID of the user of the user terminal 200, in addition to the racer ID of the specified racer. Then, the specification unit 141 registers the racer ID in the user DB 112, in association with the user ID. When the time of the race is reached, the specification unit 141 acquires the race ID associated with the user ID from the user DB 112, and supplies the same to the relation degree calculation unit 143.

The video collection unit 142 is an example of the video collection unit 12 described above. The video collection unit 142 receives the video data from each of the fixed camera 310, the drone camera 320, and the onboard camera 330 at a predetermined frame rate, and collects a plurality of pieces of video data captured in the same time section.

The relation degree calculation unit 143 is referred to also as relation degree calculation means. The relation degree calculation unit 143 calculates a degree of relation between the racer ID and the video data collected from each of the plurality of cameras. The degree of relation may be calculated based on whether the specified racer is captured in the video data or not. For example, first, the relation degree calculation unit 143 calculates the degree of relation in relation to each piece of video data by using the feature information 1132 that is associated in the racer DB 113 with the racer ID of the specified racer. More specifically, the relation degree calculation unit 143 calculates the degree of relation in relation to each piece of video data by extracting feature information from a frame image of the video data in question and comparing the extracted feature information and the feature information 1132. Moreover, the degree of relation may be calculated based not only on whether the specified racer is captured in the video data or not, but also on a size of an image region of the specified racer, a position and a level of clarity of the image region in a frame image, and the like.

The relation degree calculation unit 143 may calculate, for each camerawork type, the degree of relation between the racer ID and the video data collected from each camera of the camerawork type in question. For example, the relation degree calculation unit 143 may calculate the degree of relation between the racer ID and each of pieces of video data collected from a plurality of fixed cameras 310, and may calculate the degree of relation between the racer ID and each of pieces of video data collected from a plurality of the onboard cameras 330.

Additionally, in the case of the onboard camera 330, the captured video is highly related to the racer to which the camera is attached, but the racer to which the camera is attached is not shown in the video. Accordingly, the degree of relation is possibly not accurately calculated by the method described above. Accordingly, it suffices if the degree of relation is calculated by the method described above only with respect to the video data from cameras other than the onboard camera 330. With respect to the video from the onboard camera 330, the relation degree calculation unit 143 may calculate the degree of relation based on whether the onboard camera 330 is attached to the specified racer or not.

Furthermore, in the case where position information of the racer at a timing of capturing of the video can be grasped, the relation degree calculation unit 143 may calculate the degree of relation based on the position information of the racer and the position information of the camera that captured the video. More specifically, first, in relation to each of pieces of collected video data, the relation degree calculation unit 143 specifies, from the camera DB 114, the position information 1143 corresponding to the camera ID of the camera that captured the video. Then, the relation degree calculation unit 143 may calculate the degree of relation in such a manner that the degree of relation is increased for a camera that is positioned closer to the specified racer. Additionally, the relation degree calculation unit 143 may estimate the position information of the racer from the position information of the onboard camera 330. Also, in this case, the degree of relation may be calculated by this method only with respect to the video data from cameras other than the onboard camera 330.

The priority degree setting unit 144 is referred to also as priority degree setting means. The priority degree setting unit 144 sets a degree of priority of each of a plurality of cameras including the fixed camera 310, the drone camera 320, and the onboard camera 330. In the second example embodiment, the priority degree setting unit 144 sets the degree of priority of each camera based on the degree of relation regarding each piece of video data calculated by the relation degree calculation unit 143. For example, the priority degree setting unit 144 sets a higher degree of priority for a camera that captured video data having a high degree of relation to the racer ID. Accordingly, a video having a high degree of relation to the specified racer, such as a video mainly showing the racer, may be caused to have a high degree of priority and be displayed on the user terminal 200.

The generation unit 145 is an example of the generation unit 15 described above. The generation unit 145 generates distribution data of the user-specific video based on the degree of priority set by the priority degree setting unit 144. For example, the generation unit 145 selects, based on the degree of priority, one or more pieces of video data to be displayed by display means of the user terminal 200 from pieces of video data collected from the plurality of cameras. At this time, the generation unit 145 may select, based on the degree of priority, the video data for each camerawork type, from the video data collected from each camera of the camerawork type. For example, the generation unit 145 may select one piece of video data from the video data from the plurality of fixed cameras 310, one piece of video data from the video data from the plurality of drone cameras 320, and one piece of video data from the video data from the plurality of onboard cameras 330. Then, in the case where a plurality of pieces of video data are selected, the generation unit 145 may determine a display mode of the selected video data on the display unit 240 of the user terminal 200 based on the degrees of priority. The display mode may be a display position or a display size, or may be whether to activate the video data on the display unit 240 or not. For example, the generation unit 145 may determine the display mode such that video data with a higher degree of priority, among the pieces of selected video data, is displayed closer to a center of a screen of the display unit 240 or is displayed with a larger display size. Moreover, for example, the generation unit 145 may determine video data with a highest degree of priority, among the pieces of selected video data, as the video data that is to be actively displayed on the display unit 240.

Then, the generation unit 145 supplies, to the output control unit 146, distribution data of the user-specific video including the video data that is selected and information about the display mode.

The output control unit 146 is an example of the output control unit 16 described above. The output control unit 146 transmits the distribution data of the user-specific video to the user terminal 200, and causes the display unit 240 of the user terminal 200 to display the user-specific video.

Figure 6:
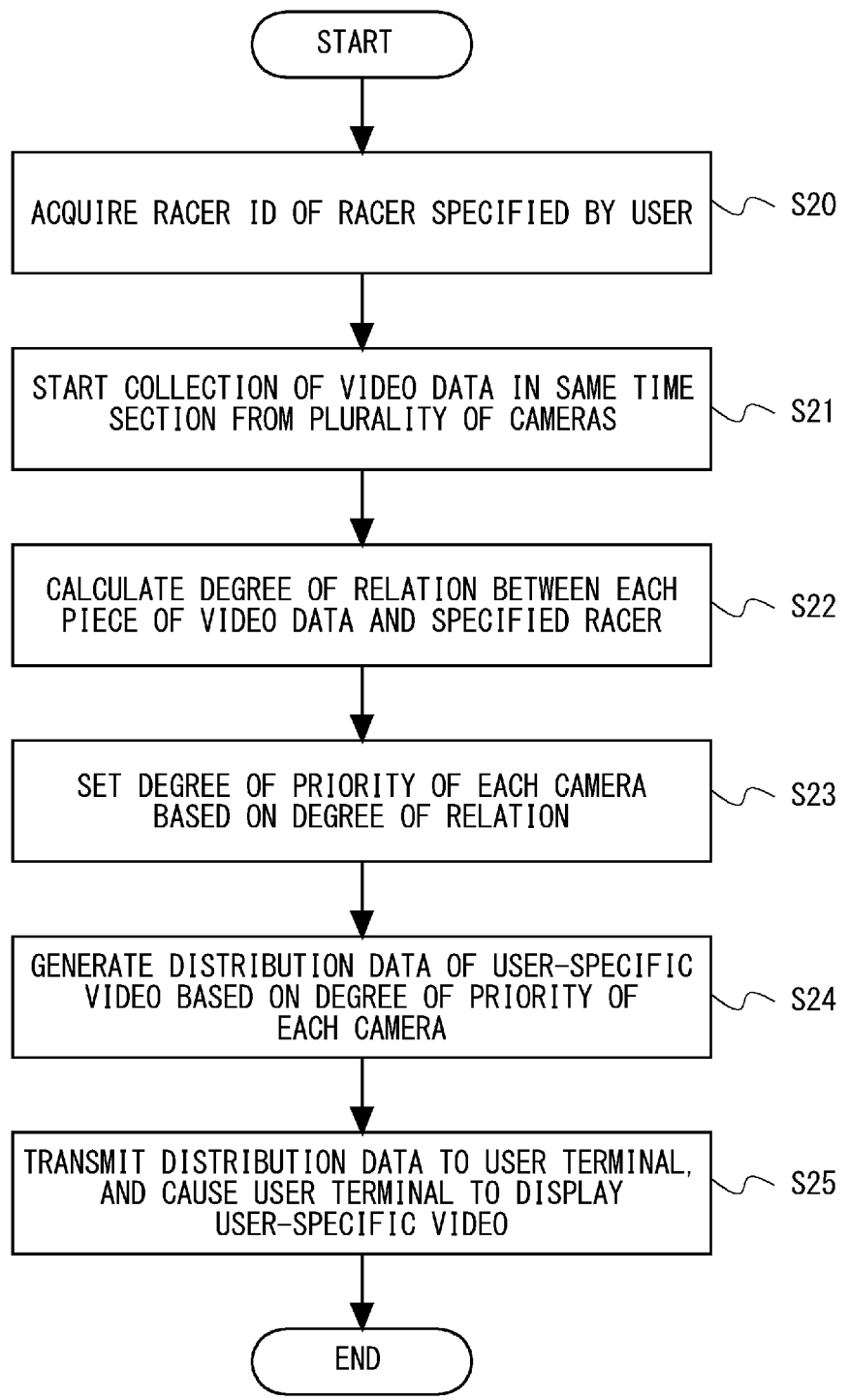
FIG. 6 is a flowchart showing a flow of a video provision method according to the second example embodiment.

FIG. 6 is a flowchart showing a flow of the video provision method according to the second example embodiment. First, when the time of a race is reached, the specification unit 141 of the video provision apparatus 100 acquires, from the user DB 112, the racer ID that is the racer ID of the racer specified by the user and that is associated with the user ID (S20). The specification unit 141 supplies the racer ID to the relation degree calculation unit 143. Next, the video collection unit 142 starts collecting the video data captured in the same time section, from each of the plurality of cameras (S21). Next, the relation degree calculation unit 143 calculates, for each piece of video data, the degree of relation between the video data and the specified racer, based on the racer ID and the video data (S22). Then, the priority degree setting unit 144 sets, based on the degree of relation of each piece of video data, the degree of priority of the camera that captured the video data in question (S23). Next, the generation unit 145 generates the distribution data of the user-specific video based on the degree of priority of each camera (S24). For example, the generation unit 145 generates, as the distribution data of the user-specific video, video data that is selected based on the degree of priority of each camera and information about the display mode that is determined based on the degree of priority of each camera. Then, the output control unit 146 transmits the distribution data to the user terminal 200 via the network N, and causes the user-specific video to be displayed by the user terminal 200 (S25).

Figure 7:
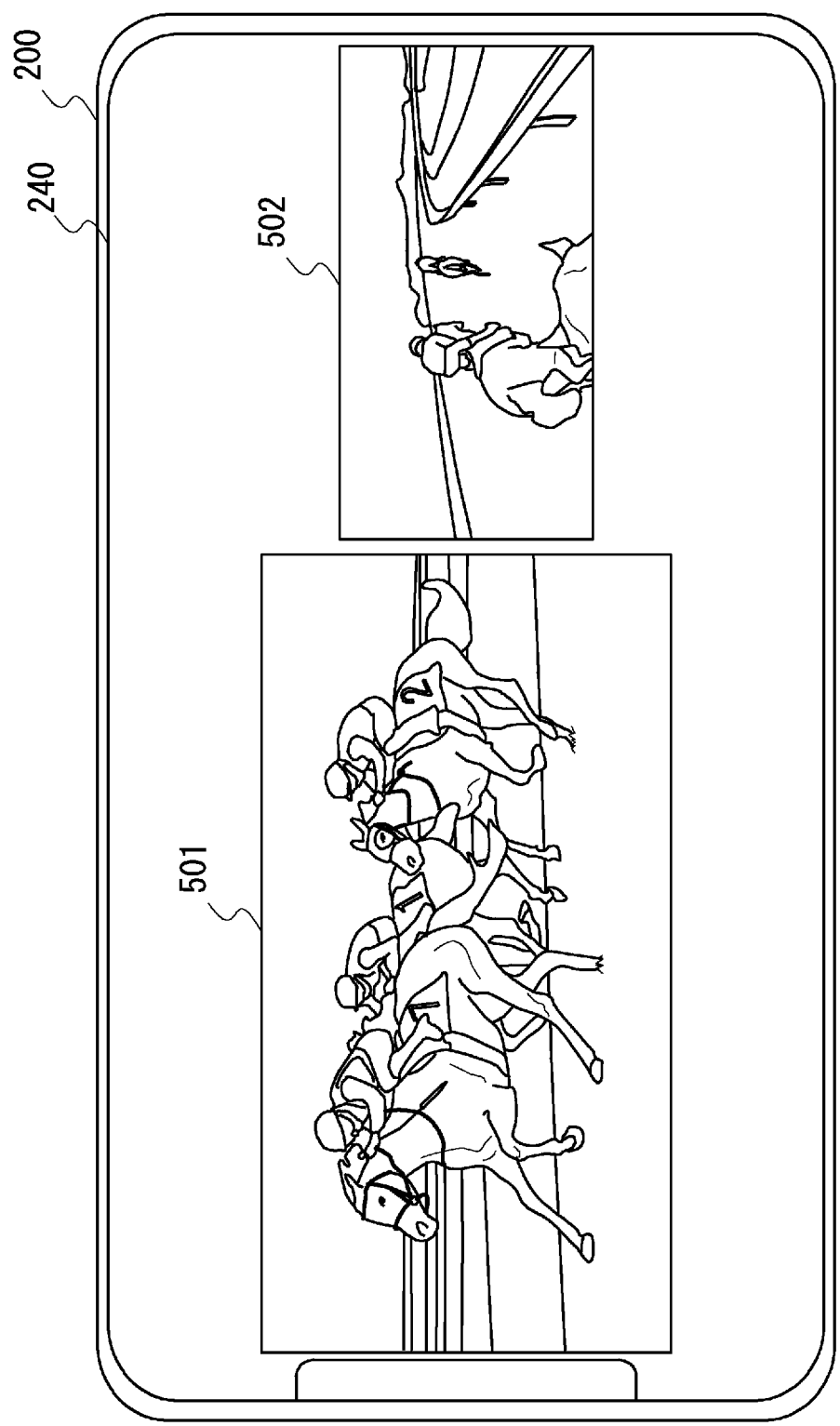
FIG. 7 is a diagram showing an example of a display screen that is displayed on the user terminal according to the second example embodiment.

FIG. 7 is a diagram showing an example of a display screen that is displayed on the user terminal 200 according to the second example embodiment. For example, it is assumed that a racer (a racehorse) with a racer ID "2" is specified by the user. As shown in FIG. 7, the user-specific video included in the distribution data includes a video 501 from the fixed camera 310 showing the racer with the racer ID "2" and a video 502 from the onboard camera 330 attached to the racer with the racer ID "2". The user terminal 200 displays the video 501 and the video 502 on the display unit 240 in a two-screen format based on information about the display mode included in the distribution data. Additionally, in addition to the user-specific video described above, information about the specified racer may also be displayed on the display unit 240. Information about the specified racer may include name of the specified racer, a racer number (a horse number or a bracket number), age, sex, racing performance, and in the case where the specified racer is a horse, name of a jockey.

Figure 8:
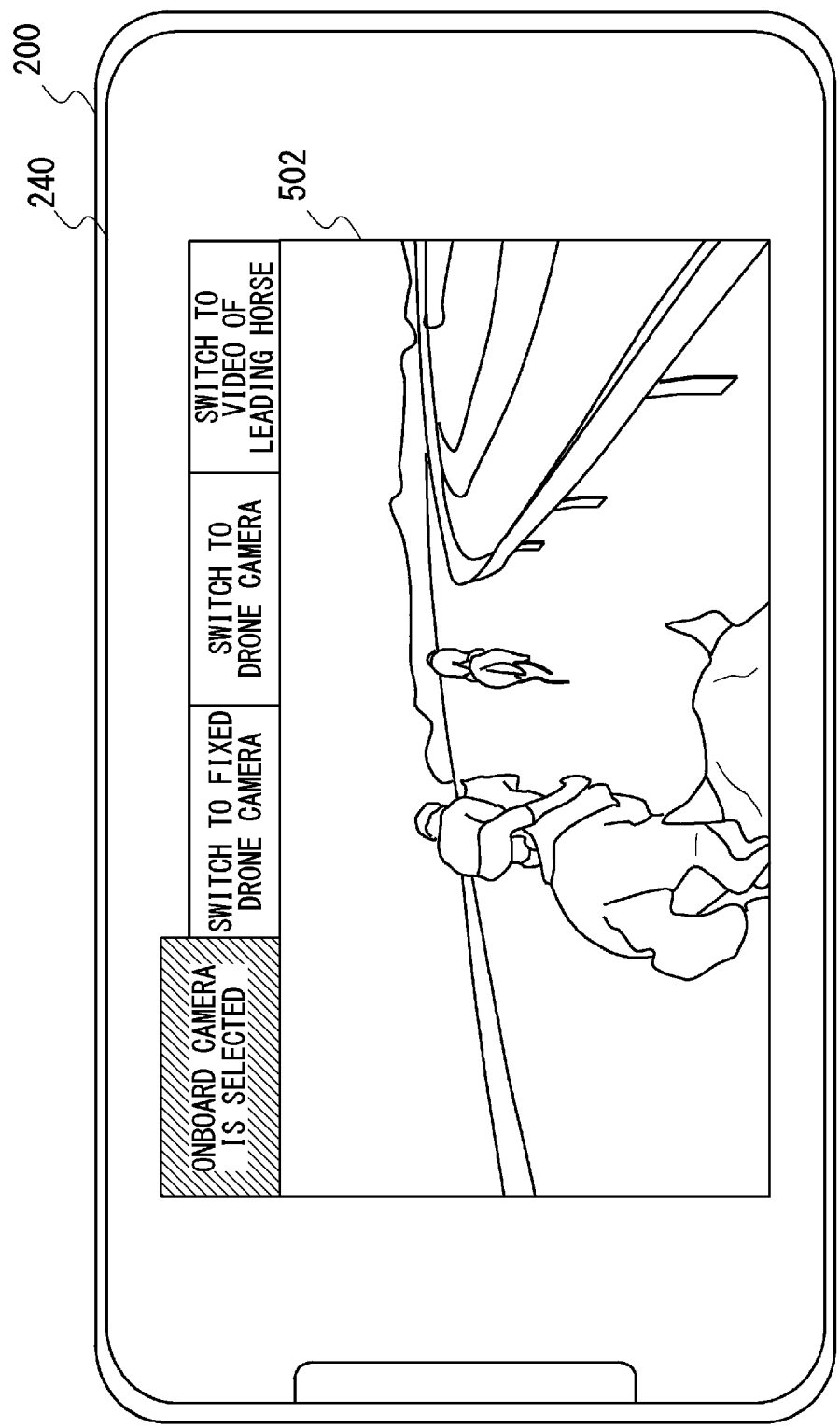
FIG. 8 is a diagram showing another example of the display screen that is displayed on the user terminal according to the second example embodiment.
Figure 9:
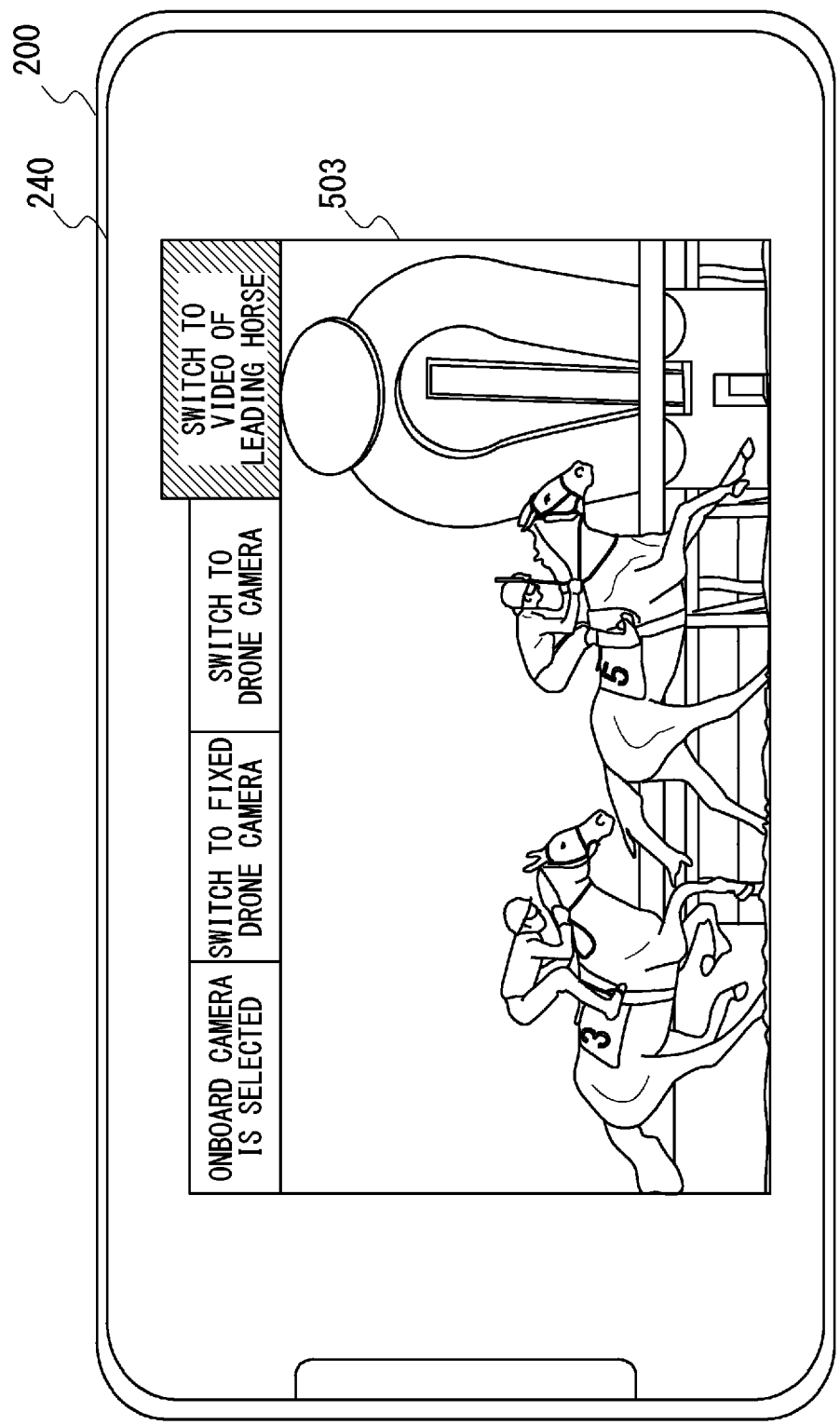
FIG. 9 is a diagram showing another example of the display screen that is displayed on the user terminal according to the second example embodiment.

FIGS. 8 and 9 are diagrams showing other examples of the display screen that is displayed on the user terminal 200 according to the second example embodiment. For example, the distribution data includes the video 501 from the fixed camera 310 described above, a video 504 (not shown) from the drone camera 320 showing the racer with the racer ID "2", and the video 502 from the onboard camera 330 described above. The user terminal 200 actively displays, on the display unit 240, only one video among the videos included in the distribution data, and inactively displays (that is, hides) other videos. In FIG. 8, the video 502 from the drone camera 320 is actively displayed, and other videos are inactively displayed. The user may switch the active video displayed on the display unit 240, by tapping and selecting a tab indicating the camerawork type. For example, in the case where the user wants to watch a bird's-eye view video of a group including the specified racer, the user selects a tab "switch to drone camera". When the selected tab is switched, the user terminal 200 may change the video that is actively displayed before switching to inactive, and switch the video from the camera corresponding to the tab after switching to active display.

Furthermore, the distribution data may also include video data from a camera with a low degree of priority (for example, with a low degree of relation to the specified racer). In the present example, the distribution data includes a video 503 (not shown) of a leading racehorse. For example, the video 503 may be a video from one of the fixed cameras 310. For example, when the user selects a tab "switch to video of leading horse", the display screen shown in FIG. 8 changes to the display screen shown in FIG. 9. In FIG. 9, the video 503 from the fixed camera 310 showing the leading racehorse is actively displayed.

Moreover, as another example of a camera with a low degree of priority, a camera that captures the entire race venue may be cited. The display screen on the user terminal 200 may include a tab for switching to the video from such a camera. When the user selects the tab, the video from the camera may be switched to active display.

In this manner, according to the second example embodiment, a user-specific video with which a camera video with a high degree of relation to the specified racer is preferentially displayed may be provided to the user. Accordingly, the user may watch a race video of a desired racer in a desirable manner, and satisfaction of the user is increased.

Third Example Embodiment

Next, a third example embodiment of the present disclosure will be described. Presently, in a race video, a camera video to be broadcast is manually selected and edited according to a stage of the race such as start, middle, or end.

Furthermore, the camera video to be broadcast is manually selected and edited according to performance of racers. The third example embodiment is characteristic in that a video provision apparatus changes the degree of priority of each camera according to a state of the race, and thereby automatically edits the user-specific video.

Figure 10:
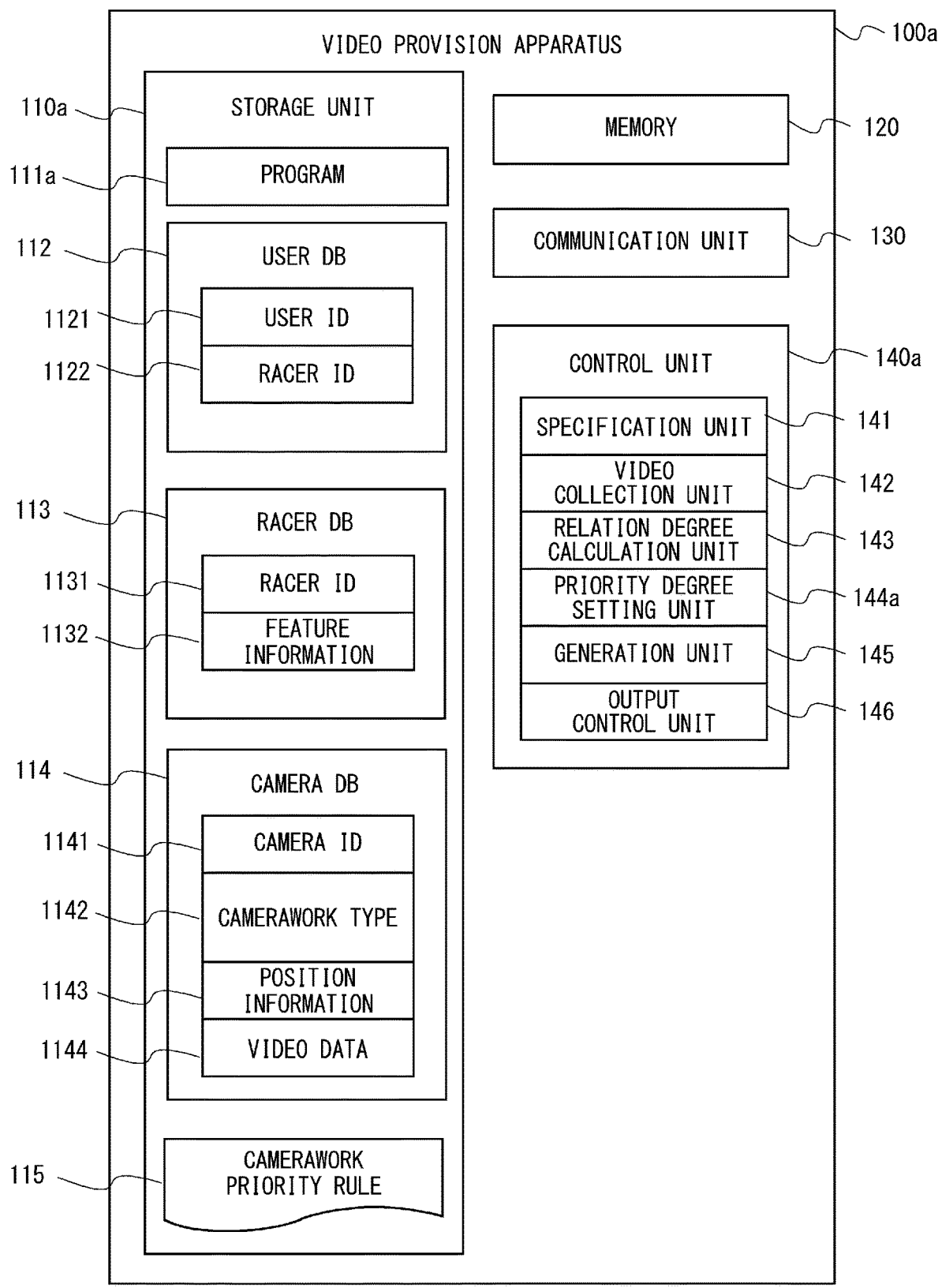
FIG. 10 is a block diagram showing a configuration of a video provision apparatus according to a third example embodiment.

FIG. 10 is a block diagram showing a configuration of a video provision apparatus 100a according to the third example embodiment. The video provision apparatus 100a basically includes the same components and functions as those of the video provision apparatus 100, but is different in that a storage unit 110a and a control unit 140a are included instead of the storage unit 110 and the control unit 140.

The storage unit 110a stores a program 111a instead of the program 111. The program 111a is a computer program for implementing a process of a video provision method according to the third example embodiment.

Furthermore, the storage unit 110a stores a camerawork priority rule 115. The camerawork priority rule 115 is a rule for changing the degree of priority according to the state of the race. In the fourth example embodiment, the camerawork priority rule 115 is a rule for determining, for each camerawork type, a degree of priority of camerawork indicating the degree of priority of a camera with the camerawork. The state of a race may be at least one of position information of each racer, a positional relationship between racers, and an elapsed time from start of the race.

The control unit 140a is different from the control unit 140 in that a priority degree setting unit 144a is included instead of the priority degree setting unit 144.

The priority degree setting unit 144a sets the degree of priority of each camera based on the degree of relation and the camerawork priority rule 115. For example, first, the priority degree setting unit 144a sets the degree of priority of camerawork for each camerawork type according to the camerawork priority rule 115. That is, the priority degree setting unit 144a sets the degree of priority of camerawork for each camerawork type based on at least one of the position information of the specified racer, a positional relationship between the specified racer and another racer, and the elapsed time from start of the race. Furthermore, as in the second example embodiment described above, the priority degree setting unit 144a sets an individual degree of priority of a camera based on the degrees of relation of the video data collected from the plurality of cameras. A method of setting the individual degree of priority may be the same as the method of setting the degree of priority according to the second example embodiment. Moreover, the priority degree setting unit 144a sets the degree of priority of each camera based on the degree of priority of camerawork and the individual degree of priority.

Then, the generation unit 145 generates the distribution data of the user-specific video based on the degree of priority set by the priority degree setting unit 144a.

FIG. 11 is a diagram for describing an example of the camerawork priority rule 115 according to the third example embodiment. The camerawork priority rule 115 in the present drawing sets the camerawork type that is a priority target, according to the elapsed time from start of the race. For example, from $t_1$ to $t_2$ from the start of the race, the priority degree setting unit 144a increases the degree of priority of camerawork by a predetermined amount for a camera, the camerawork type of which is the fixed camera. Furthermore, for example, from $t_2$ to $t_3$ from the start of the race, the priority degree setting unit 144a increases the degree of priority of camerawork by a predetermined amount for a camera, the camerawork type of which is the drone camera. Furthermore, for example, from $t_3$ to $t_4$ from the start of the race, the priority degree setting unit 144a increases the degree of priority of camerawork by a predetermined amount for a camera, the camerawork type of which is the onboard camera. Moreover, for example, after $t_4$ from the start of the race, the priority degree setting unit 144a increases the degree of priority of camerawork by a predetermined amount for a camera, the camerawork type of which is the fixed camera.

Additionally, in addition to or instead of the camerawork priority rule 115, the priority degree setting unit 144a may adopt a rule determining that, when a certain event is detected, the degree of priority is increased by a predetermined amount for a camera capturing the scene. A certain event may be the case where racers who are closely competing with each other are in close proximity to each other or crash into each other, or if the racer is a horse, the jockey falls from the horse. More specifically, in the case where a distance between racers is equal to or smaller than a predetermined threshold or an impact is detected from a certain racer, the priority degree setting unit 144a may increase the degree of priority of the onboard camera on the racer or the degree of priority of the camera capturing the racer by a predetermined amount. Furthermore, the priority degree setting unit 144a may adopt a rule according to which, in the case where there is a racer close to a predetermined point (such as a goal), the degree of priority of the fixed camera installed near the goal is increased by a predetermined amount. More specifically, the priority degree setting unit 144a may increase the degree of priority of the fixed camera installed near the goal by a predetermined amount in a case where one of racers is detected to have reached a predetermined distance of the predetermined point, based on the position information of each racer. Setting may be performed such that, when an event as described above is detected, the degree of priority of the camera capturing the scene is increased than for other cameras. The video of the scene may thus be reliably interruptedly displayed on the user terminal 200.

Figure 12:
FIG. 12 is a diagram showing an example of a display screen that is displayed on the user terminal according to the third example embodiment.

FIG. 12 is a diagram showing an example of the display screen that is displayed on the user terminal 200 according to the third example embodiment. FIG. 12 shows the user-specific video from $t_1$ to $t_2$ from the start of the race. The user-specific video included in the distribution data of the present example includes the video 501 from the fixed camera 310 showing the specified racer, the video 504 from the drone camera 320 showing the specified racer, and the video 502 from the onboard camera 330 attached to the specified racer. The fixed camera is prioritized from $t_1$ to $t_2$ from the start of the race, and thus, a display size of the video 501 is increased. The video 504 and the video 502 from, respectively, the drone camera 320 and the onboard camera 330 with lower degrees of priority than that of the fixed camera are displayed smaller than the video 501.

As described above, according to the third example embodiment, the video provision apparatus 100a is able to automatically edit the user-specific video based on the camerawork priority rule 115 according to the state of the race. For example, the video provision apparatus 100a is capable of performing editing in such a way that prioritized display is performed using a fixed camera that zooms out at the beginning of the race, the drone camera and the onboard camera in the middle of the race, and a fixed camera that is near the goal and that zooms in at the end of the race, and satisfaction of the user may be even more increased.

Additionally, the priority degree setting unit 144a may set the degree of priority of camerawork in relation to each camera by using a trained camerawork priority degree setting model that outputs the degree of priority of camerawork according to the state of the race. For example, the camerawork priority degree setting model may be a model that takes, as input, the camerawork type of a video that is broadcast and a timing of broadcast, and that outputs the degree of priority of camerawork of each camerawork type at a predetermined timing. By performing learning over and over, more natural automatic switching of camerawork may be achieved.

Fourth Example Embodiment

Next, a fourth example embodiment of the present disclosure will be described. The fourth example embodiment is characteristic in that a video provision apparatus modifies a video to express a state of the specified racer based on the position information or vital (biological) information of the specified racer.

Figure 13:
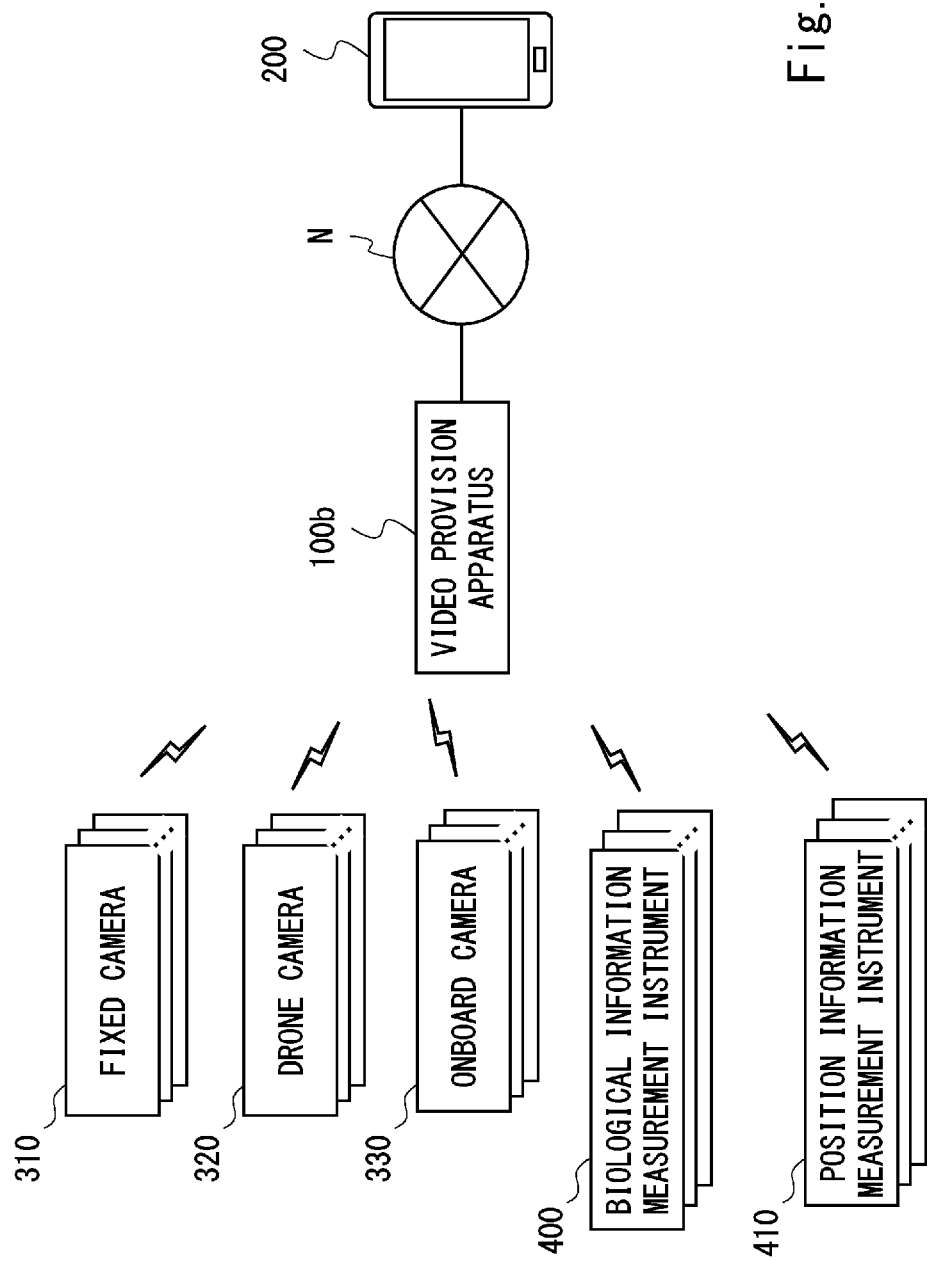
FIG. 13 is a block diagram showing an overall configuration of a video provision system according to a fourth example embodiment.

FIG. 13 is a block diagram showing an overall configuration of a video provision system 1000b according to the fourth example embodiment. The video provision system 1000b includes a video provision apparatus 100b instead of the video provision apparatus 100a, one or more biological information measurement instruments 400, and one or more position information measurement instruments 410.

The biological information measurement instrument 400 is a measurement instrument that is worn on a body of each racer, and that measures the biological information of each racer. The biological information is heart rate, pulse, blood pressure, and the like, for example. The biological information measurement instrument 400 transmits the biological information that is measured to the video provision apparatus 100b, together with the racer ID.

The position information measurement instrument 410 is a measurement instrument that is attached to the body of each racer or a tool that is used by each racer, and that measures the position information of each racer. The position information measurement instrument 410 may be implemented by the onboard camera 330. The position information measurement instrument 410 may measure the position information by receiving GPS information. The position information measurement instrument 410 transmits the position information that is measured to the video provision apparatus 100b, together with the racer ID.

The video provision apparatus 100b generates the distribution data of the user-specific video by using at least one of the biological information of each racer and the position information of each racer. Then, the video provision apparatus 100b transmits the distribution data to the user terminal 200.

Figure 14:
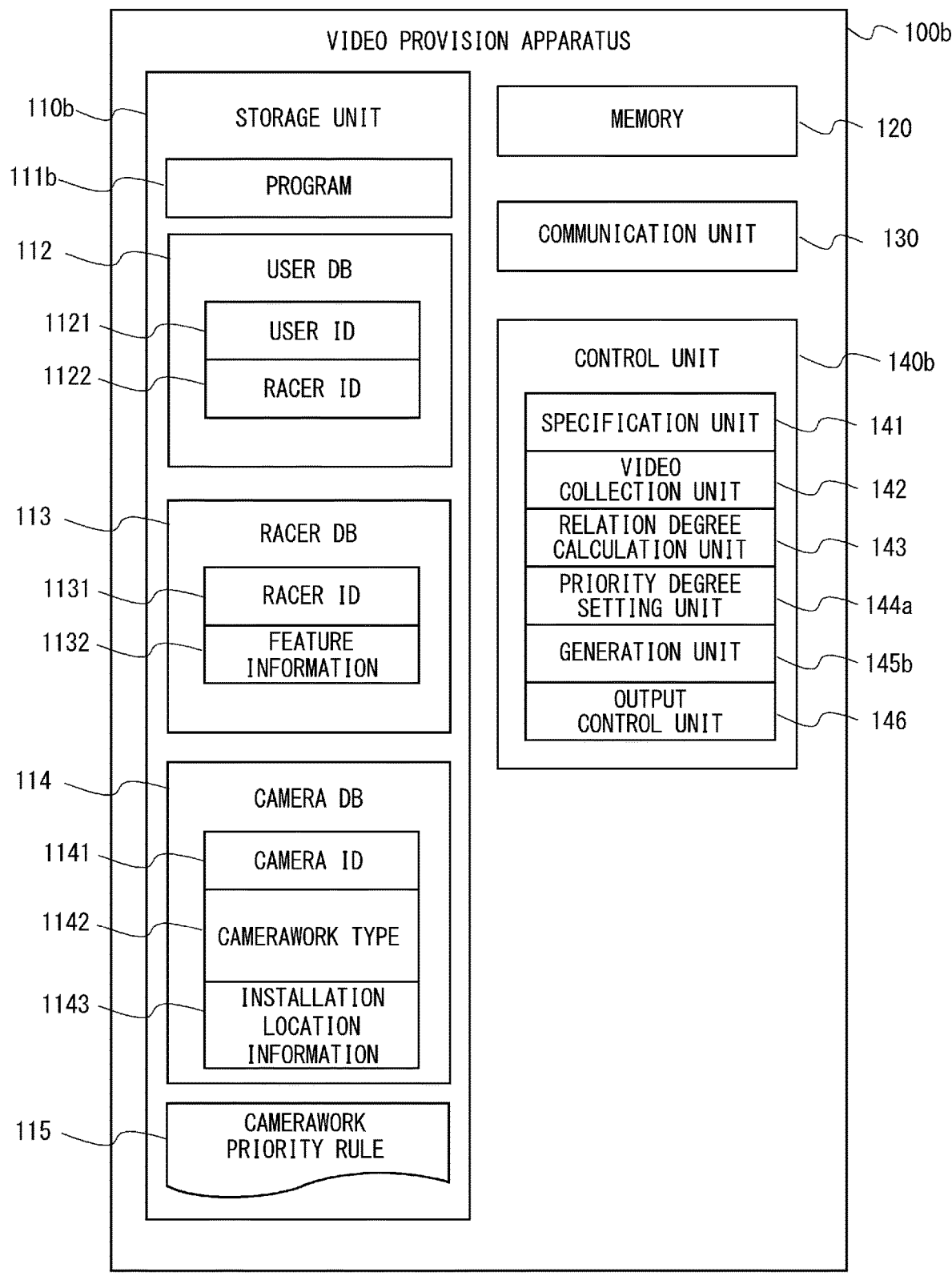
FIG. 14 is a block diagram showing a configuration of a video provision apparatus according to the fourth example embodiment.

FIG. 14 is a block diagram showing a configuration of the video provision apparatus 100b according to the fourth example embodiment. The video provision apparatus 100b is different from the video provision apparatus 100a in that a storage unit 110b and a control unit 140b are included instead of the storage unit 110a and the control unit 140a.

The storage unit 110b stores a program 111b instead of the program 111a. The program 111b is a computer program for implementing a process of a video provision method according to the fourth example embodiment.

The control unit 140b is different from the control unit 140a in that a generation unit 145b is included instead of the generation unit 145. First, the generation unit 145b generates a first user-specific video from videos collected from the plurality of cameras, based on the degrees of priority set by the priority degree setting unit 144a. The degree of priority is set based on the degree of relation that is calculated based on the racer ID of the specified racer. Additionally, in the fourth example embodiment, as in the third example embodiment described above, the degree of priority is set based on the camerawork priority rule 115 in addition to the degree of relation. Additionally, a method for generating the first user-specific video may be the same as a method for generating the user-specific video according to the second example embodiment.

Next, the generation unit 145b generates a superimposed image that shows a state of the specified racer. The state of the specified racer may be the position information or the biological information of the specified racer. In other words, the generation unit 145b generates a superimposed image showing the position information, based on the position information of the specified racer, or generates a superimposed image showing the biological information, based on the biological information of the specified racer. Then, the generation unit 145b generates a second user-specific video that is obtained by superimposing the superimposed image that is generated on the first user-specific user video. Additionally, the generation unit 145b may determine whether to superimpose the superimposed image or not and a superimposed position of the superimposed image, according to the camerawork type of the camera that captured the video included in the first user-specific video. Furthermore, the generation unit 145b may determine a type of the superimposed image to be superimposed (the superimposed image showing the biological information or the superimposed image showing the position information), according to the camerawork type. The generation unit 145b generates distribution data of the user-specific video including the second user-specific video and information about a display mode, and supplies the same to the output control unit 146.

The output control unit 146 transmits the distribution data including the second user-specific video described above to the user terminal 200, and causes the second user-specific video to be displayed on the display unit 240 of the user terminal 200.

Figure 15:
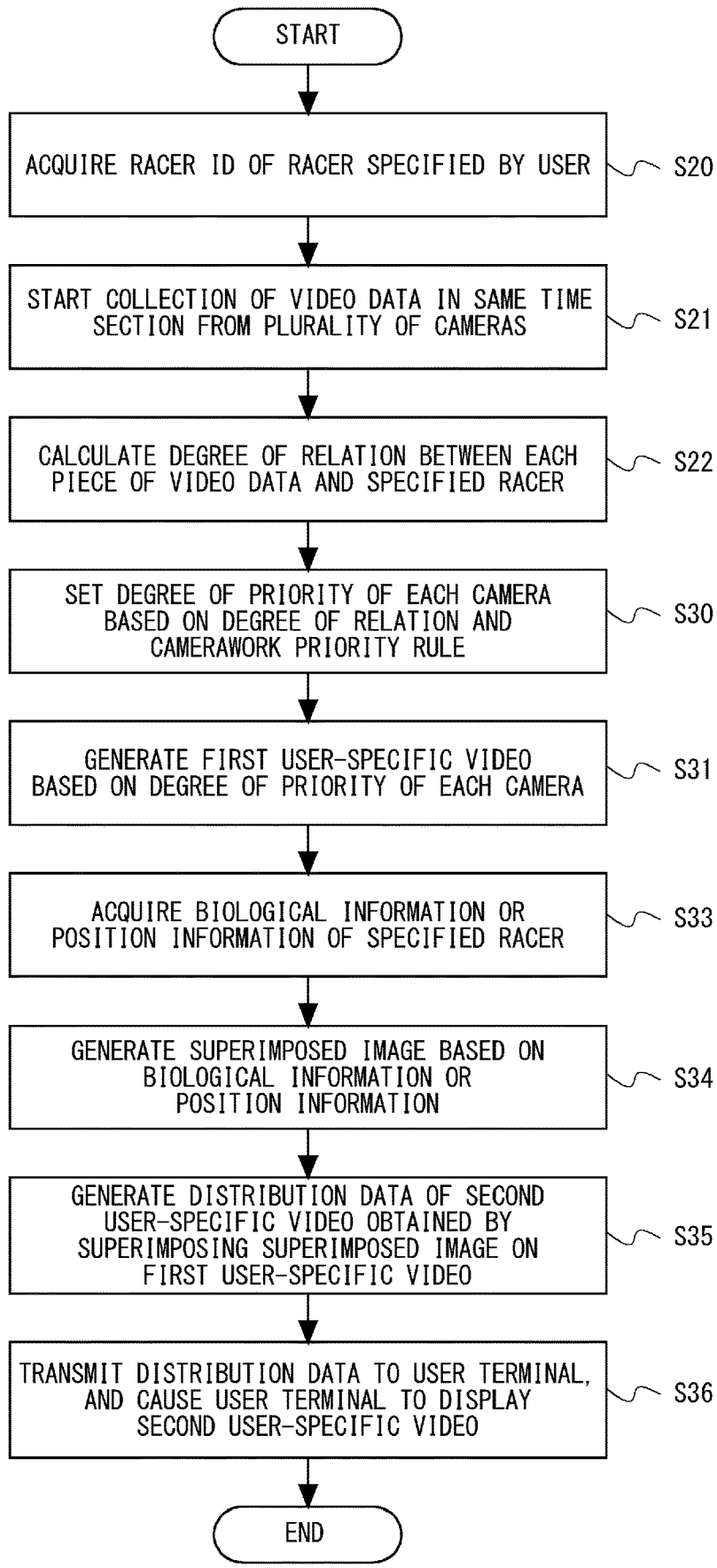
FIG. 15 is a flowchart showing a flow of a video provision method according to the fourth example embodiment.

FIG. 15 is a flowchart showing a flow of a video provision method according to the fourth example embodiment. Steps shown in FIG. 15 include S30 to S36 in addition to S20 to S22 shown in FIG. 6.

After the relation degree calculation unit 143 calculates the degree of relation to each specified racer for each piece of video data (S22), the priority degree setting unit 144a sets the degree of priority of each camera based on the degree of relation and the camerawork priority rule 115 (S30). Next, the generation unit 145b generates the first user-specific video based on the degree of priority of each camera (S31). Next, the generation unit 145b acquires the biological information or the position information of the specified racer from the biological information measurement instrument 400 or the position information measurement instrument 410 (S33). Next, the generation unit 145b generates a superimposed image showing the state of the racer, based on the biological information or the position information of the specified racer (S34). Then, the generation unit 145b generates the distribution data of the second user-specific video that is obtained by superimposing the superimposed image on the first user-specific video (S35). Then, the output control unit 146 transmits the distribution data to the user terminal 200, and causes the second user-specific video to be displayed by the user terminal 200 (S36).

Figure 16:
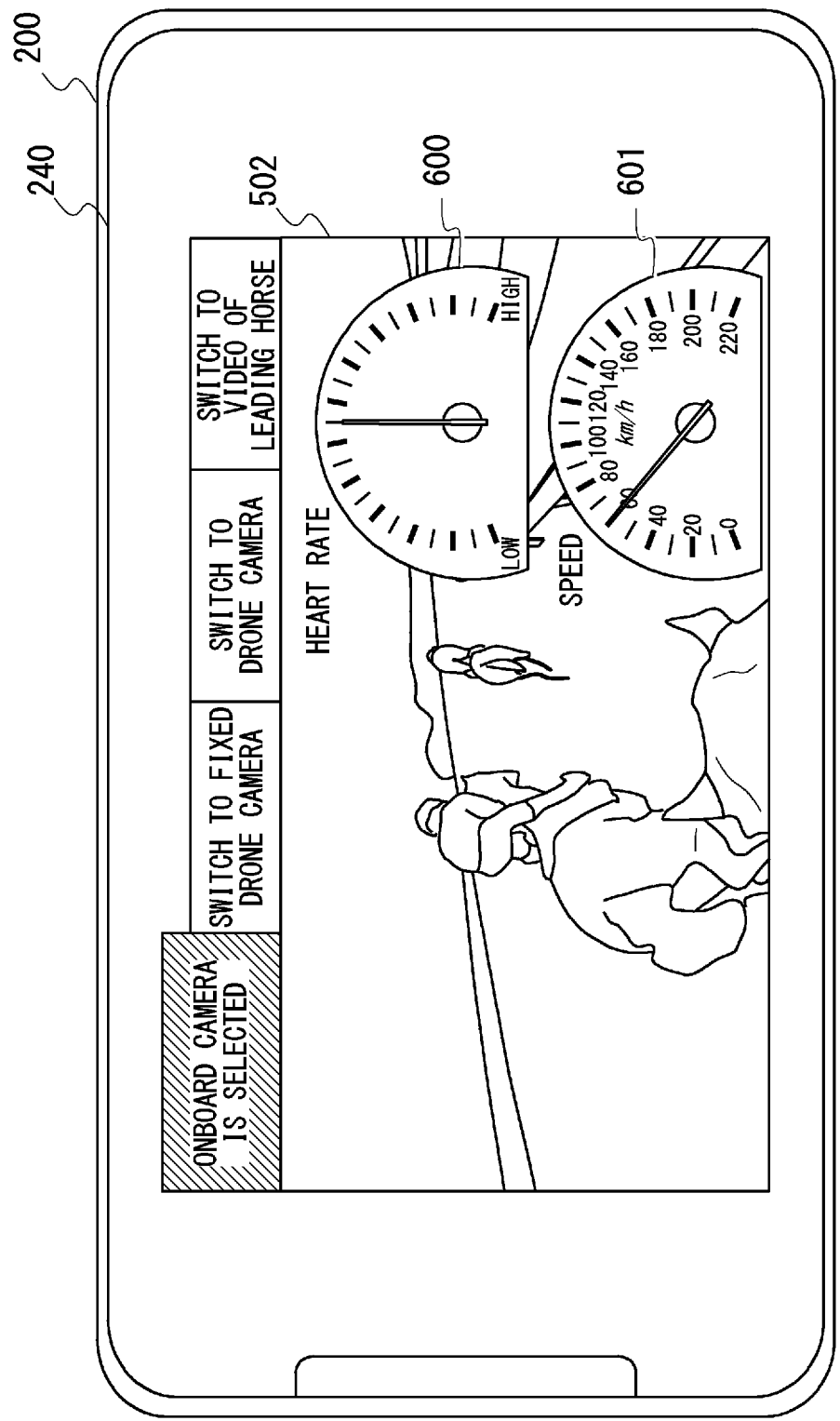
FIG. 16 is a diagram showing an example of a display screen that is displayed on the user terminal according to the fourth example embodiment.
Figure 17:
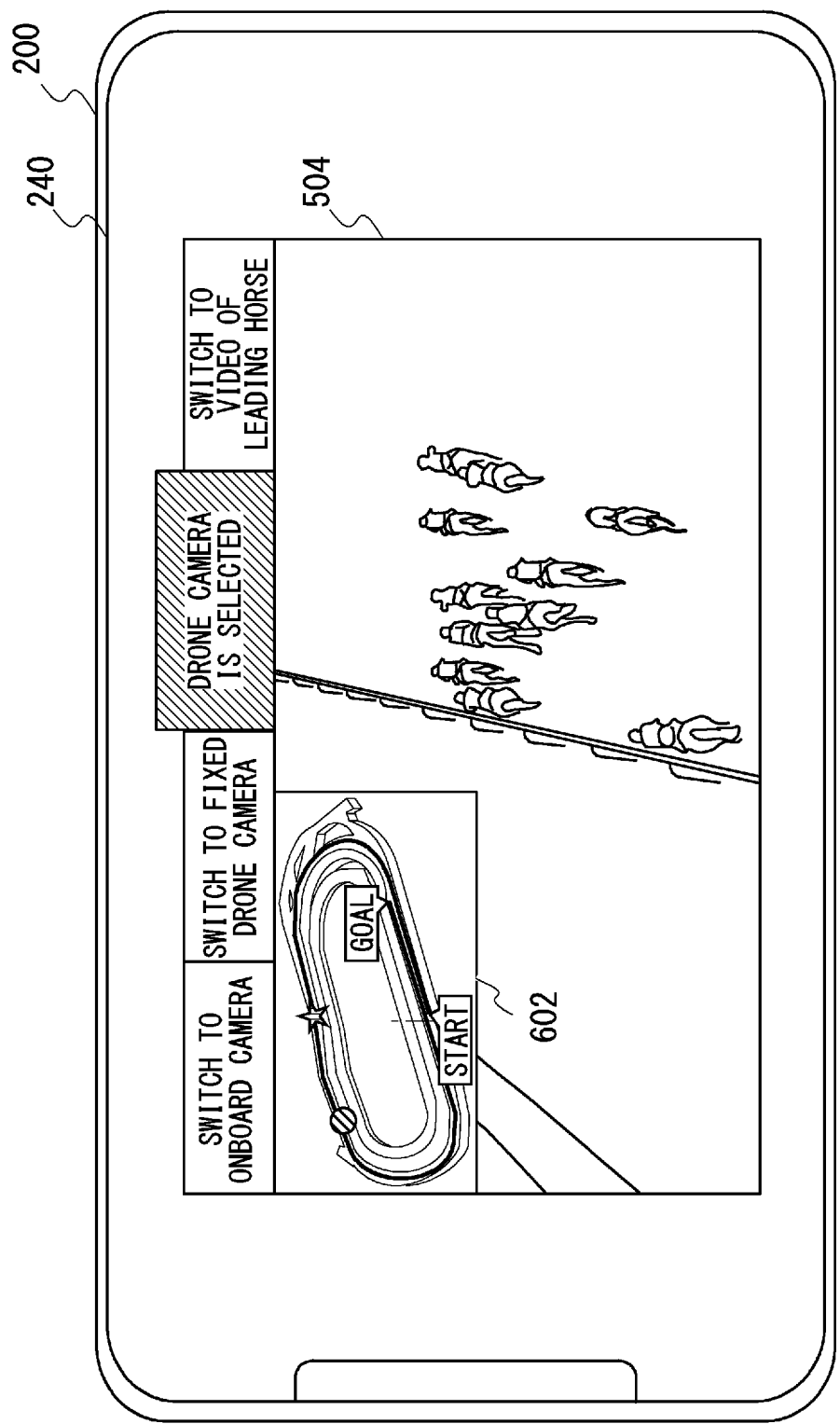
FIG. 17 is a diagram showing an example of the display screen that is displayed on the user terminal according to the fourth example embodiment.

FIGS. 16 and 17 are diagrams showing examples of the display screen that is displayed on the user terminal 200 according to the fourth example embodiment. FIG. 16 shows the second user-specific video that is obtained by superimposing a superimposed image 600 showing the biological information of the specified racer on the video 502 from the onboard camera 330 attached to the specified user. The superimposed image 600 in the present drawing shows how high the heart rate of the specified racer is. The user may thus easily grasp a current state of the specified racer and may enjoy more realistic atmosphere of the race. Additionally, in the present drawing, the second user-specific video includes a superimposed image 601 showing a speed of the specified racer, and the current state of the specified racer is shown in a greater detail.

Furthermore, FIG. 17 shows the second user-specific video that is obtained by superimposing a superimposed image 602 showing the position information of the specified racer on the video 504 from the drone camera 320 showing the specified racer. The superimposed image 602 in the present diagram shows which position on the track the specified racer is running. Additionally, the superimposed image 602 may further show a position of the leading racer. The user may thus easily grasp a state of the entire race while checking the state of the specified racer in the video.

As described above, satisfaction of the user may be further increased by providing a user-specific video that is modified to express the state of the specified racer.

The example embodiments described above describe configurations of hardware, but such cases are not restrictive. In the present disclosure, a process may be implemented by causing a processor to execute a computer program.

In the example described above, a program includes a command group (or a software code) that, when read by a computer, causes the computer to perform one or more functions described in the example embodiments. The program may be stored in a non-transitory computer-readable medium or a tangible storage medium. Examples of the computer-readable medium or the tangible storage medium include a random-access memory (RAM), a read-only memory (ROM), a flash memory, a solid-state drive (SSD), and other memory technologies, a CD-ROM, a digital versatile disc (DVD), a Blu-ray (registered trademark) disc, and other optical disc storages, a magnetic cassette, a magnetic tape, a magnetic disk storage, and other magnetic storage devices. The program may be transmitted by a transitory computer-readable medium or a communication medium. Examples of the transitory computer-readable medium or the communication medium include electrical, optical, acoustic, and other types of propagation signals.

Additionally, the present disclosure is not limited to the example embodiments described above, and may be changed as appropriate within the scope of the disclosure. For example, in the fourth example embodiment, the video provision apparatus 100b may generate the distribution data of the user-specific video by using the biological information from the biological information measurement instrument 400 worn on the body of each racer. Here, in the case where the racer is a horse, the biological information measurement instrument 400 is attached to the body of the horse, but in addition to or instead of being attached to the body of the horse, the biological information measurement instrument 400 may be worn on the body of the jockey to measure the biological information of the jockey. The video provision apparatus 100b may generate the distribution data of the user-specific video by using the biological information of each jockey. Moreover, in the case where the racer is a competitor in motorboat racing, a measurement instrument for measuring a state of a boat that is used by the competitor may be attached to the boat. The video provision apparatus 100b may acquire the state of the boat used by the specified racer, and may generate the distribution data of the user-specific video by superimposing a superimposed image showing the state of the boat on the first user-specific video. By providing a user-specific video that is modified to express the state of the jockey on the specified racer or the state of the boat in this manner, satisfaction of the user may be further increased.

The example embodiments described above may be partly or entirely described by, but not limited to, Supplementary notes below.

(Supplementary Note 1)
   A video provision apparatus including:
      specification means for acquiring a racer ID for identifying a racer specified by a user from among racers that participate in a race;
      video collection means for collecting videos of the race captured in the same time section from a plurality of cameras;
      generation means for generating, based on the racer ID specified by the user, a user-specific video from the videos collected from the plurality of cameras; and
      output control means for causing a user terminal used by the user to output the user-specific video.

(Supplementary Note 2)
   The video provision apparatus according to Supplementary note 1, further including priority degree setting means for setting a degree of priority of each of the plurality of cameras,
      in which the generation means generates the user-specific video based on the degree of priority.

(Supplementary Note 3)
   The video provision apparatus according to Supplementary note 2, in which the priority degree setting means sets the degree of priority of each of the plurality of cameras based on a degree of relation between a video collected from each of the plurality of cameras and the racer ID.

(Supplementary Note 4)
   The video provision apparatus according to Supplementary note 3, in which the priority degree setting means sets the degree of priority of each of the plurality of cameras based on at least one of position information of the racer with the racer ID and an elapsed time from start of the race.

(Supplementary Note 5)
   The video provision apparatus according to any one of Supplementary notes 2 to 4, in which the generation means selects, based on the degree of priority, one or more videos that are to be displayed by display means of the user terminal, from the videos collected from the plurality of cameras.

(Supplementary Note 6)
   The video provision apparatus according to Supplementary note 5, in which the generation means determines, based on the degree of priority, a display mode of the one or more videos that are selected on the display means of the user terminal.

(Supplementary Note 7)
   The video provision apparatus according to any one of Supplementary notes 1 to 6, in which
      the generation means
         generates, based on the racer ID specified by the user, a first user-specific video from the videos collected from the plurality of cameras, generates, based on position information of the racer with the racer ID specified by the user or on biological information of the racer, a superimposed image showing a state of the racer, and generates a second user-specific video that is obtained by superimposing the superimposed image on the first user-specific video, and the output control means causes the user terminal to output the second user-specific video.

(Supplementary Note 8)

A video provision system including:
a video provision apparatus; and
a user terminal that is used by a user, in which
the video provision apparatus includes
specification means for acquiring a racer ID for identifying a racer specified by the user from among racers that participate in a race,
video collection means for collecting videos of the race captured in the same time section from a plurality of cameras,
generation means for generating, based on the racer ID specified by the user, a user-specific video from the videos collected from the plurality of cameras, and
output control means for causing the user terminal to output the user-specific video.

(Supplementary Note 9)

A video provision method including:
acquiring a racer ID for identifying a racer specified by a user from among racers that participate in a race;
collecting videos of the race captured in the same time section from a plurality of cameras;
generating, based on the racer ID specified by the user, a user-specific video from the videos collected from the plurality of cameras; and
causing a user terminal used by the user to output the user-specific video.

(Supplementary Note 10)

A non-transitory computer-readable medium storing a program for causing a computer to perform:
a specification process for acquiring a racer ID for identifying a racer specified by a user from among racers that participate in a race;
a video collection process for collecting videos of the race captured in the same time section from a plurality of cameras;
a generation process for generating, based on the racer ID specified by the user, a user-specific video from the videos collected from the plurality of cameras; and
an output control process for causing a user terminal used by the user to output the user-specific video.

REFERENCE SIGNS LIST 10, 100, 100a, 100b VIDEO PROVISION APPARATUS
11, 141 SPECIFICATION UNIT
12 VIDEO COLLECTION UNIT
142 VIDEO COLLECTION UNIT
15, 145, 145b GENERATION UNIT
16, 146 OUTPUT CONTROL UNIT
110, 110a, 110b STORAGE UNIT
111, 111a, 111b PROGRAM
112 USER DB
1121 USER ID
1122 RACER ID
113 RACER DB
1131 RACER ID
1132 FEATURE INFORMATION
114 CAMERA DB
1141 CAMERA ID
1142 CAMERAWORK TYPE
1143 POSITION INFORMATION
1144 VIDEO DATA
115 CAMERAWORK PRIORITY RULE
120 MEMORY
130 COMMUNICATION UNIT
140, 140a, 140b CONTROL UNIT
143 RELATION DEGREE CALCULATION UNIT
144 PRIORITY DEGREE SETTING UNIT
144a PRIORITY DEGREE SETTING UNIT
200 USER TERMINAL
220 STORAGE UNIT
230 COMMUNICATION UNIT
240 DISPLAY UNIT
245 AUDIO OUTPUT UNIT
250 INPUT UNIT
260 CONTROL UNIT
310 FIXED CAMERA
320 DRONE CAMERA
330 ONBOARD CAMERA
400 BIOLOGICAL INFORMATION MEASUREMENT INSTRUMENT
410 POSITION INFORMATION MEASUREMENT INSTRUMENT
501, 502, 503, 504 VIDEO
600, 601 SUPERIMPOSED IMAGE
1000, 1000b VIDEO PROVISION SYSTEM
N NETWORK

What is claimed is:

1. A video provision apparatus comprising:
a memory storing instructions; and
at least one processor configured to execute the instructions to:
acquire a racer ID for identifying a racer specified by a user from among racers that participate in a race;
collect videos of the race captured in a same time section from a plurality of cameras;
set a degree of priority of each of the plurality of cameras based on at least one of a positional relationship between the specified racer and another racer and an elapsed time from start of the race;
in a case where the set degree of priority is set based on the elapsed time from start of the race, increase the degree of priority of an onboard camera relating to the specified racer or a camera capturing the specified racer by a predetermined amount, wherein a distance between the specified racer and the another racer is equal to or smaller than a predetermined threshold;
generate, based on the racer ID specified by the user and the set degree of priority, a user-specific video from the videos collected from the plurality of cameras; and
cause a user terminal used by the user to output the user-specific video.

2. The video provision apparatus according to claim 1, wherein the at least one processor is configured to execute the instructions to:
in a case where the set degree of priority is set based on the positional relationship, increase the degree of priority of a camera by a predetermined amount based on a type of camerawork of the camera.

3. The video provision apparatus according to claim 1, wherein the at least one processor is configured to execute the instructions to select, based on the degree of priority, one or more videos that are to be displayed by display means of the user terminal, from the videos collected from the plurality of cameras.

4. The video provision apparatus according to claim 3, wherein the at least one processor is configured to execute the instructions to determine, based on the degree of priority, a display mode of the one or more videos that are selected on the display means of the user terminal.

5. The video provision apparatus according to claim 1, wherein the at least one processor is configured to execute the instructions to:
   generate, based on the racer ID specified by the user, a first user-specific video from the videos collected from the plurality of cameras;
   generate, based on position information of the racer with the racer ID specified by the user or on biological information of the racer, a superimposed image showing a state of the racer;
   generate a second user-specific video that is obtained by superimposing the superimposed image on the first user-specific video; and
   cause the user terminal to output the second user-specific video.

6. A video provision method performed by at least one processor and comprising:
   acquiring a racer ID for identifying a racer specified by a user from among racers that participate in a race;
   collecting videos of the race captured in a same time section from a plurality of cameras;
   setting a degree of priority of each of the plurality of cameras based on at least one of a positional relationship between the specified racer and another racer and an elapsed time from start of the race;
   in a case where the set degree of priority is set based on the elapsed time from start of the race, increasing the degree of priority of an onboard camera relating to the specified racer or a camera capturing the specified racer by a predetermined amount, wherein a distance between the specified racer and the another racer is equal to or smaller than a predetermined threshold;
   generating, based on the racer ID specified by the user and the set degree of priority, a user-specific video from the videos collected from the plurality of cameras; and
   causing a user terminal used by the user to output the user-specific video.

7. A non-transitory computer-readable medium storing a program executable by a computer to:
   acquire a racer ID for identifying a racer specified by a user from among racers that participate in a race;
   collect videos of the race captured in a same time section from a plurality of cameras;
   set a degree of priority of each of the plurality of cameras based on at least one of a positional relationship between the specified racer and another racer and an elapsed time from start of the race;
   in a case where the set degree of priority is set based on the elapsed time from start of the race, increase the degree of priority of an onboard camera relating to the specified racer or a camera capturing the specified racer by a predetermined amount, wherein a distance between the specified racer and the another racer is equal to or smaller than a predetermined threshold;
   generate, based on the racer ID specified by the user and the set degree of priority, a user-specific video from the videos collected from the plurality of cameras; and
   cause a user terminal used by the user to output the user-specific video.

8. The method according to claim 6, wherein the method comprises:
   in a case where the set degree of priority is set based on the positional relationship, increasing the degree of priority of a camera by a predetermined amount based on a type of camerawork of the camera.

9. The method according to claim 6, wherein the method comprises selecting, based on the degree of priority, one or more videos that are to be displayed by display means of the user terminal, from the videos collected from the plurality of cameras.

10. The method according to claim 9, wherein the method comprises determining, based on the degree of priority, a display mode of the one or more videos that are selected on the display means of the user terminal.

11. The method according to claim 6, wherein the method comprises:
   generating, based on the racer ID specified by the user, a first user-specific video from the videos collected from the plurality of cameras;
   generating, based on position information of the racer with the racer ID specified by the user or on biological information of the racer, a superimposed image showing a state of the racer;
   generating a second user-specific video that is obtained by superimposing the superimposed image on the first user-specific video; and
   causing the user terminal to output the second user-specific video.

* * * * *